(12) United States Patent
Bonanno et al.

(10) Patent No.: US 9,152,425 B2
(45) Date of Patent: *Oct. 6, 2015

(54) MITIGATING INSTRUCTION PREDICTION LATENCY WITH INDEPENDENTLY FILTERED PRESENCE PREDICTORS

(71) Applicant: International Business Machines Corporation, Armonk, NY (US)

(72) Inventors: James J. Bonanno, Wappingers Falls, NY (US); Brian R. Prasky, Wappingers Falls, NY (US); Anthony Saporito, Highland, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/101,417

(22) Filed: Dec. 10, 2013

(65) Prior Publication Data

US 2014/0101418 A1 Apr. 10, 2014

Related U.S. Application Data

(63) Continuation of application No. 13/523,784, filed on Jun. 14, 2012.

(51) Int. Cl.
*G06F 9/38* (2006.01)
(52) U.S. Cl.
CPC ............... *G06F 9/3804* (2013.01); *G06F 9/38* (2013.01)
(58) Field of Classification Search
None
See application file for complete search history.

(56) References Cited

U.S. PATENT DOCUMENTS

| 5,394,529 | A | 2/1995 | Brown, III et al. | |
| 7,493,480 | B2* | 2/2009 | Emma et al. | 712/240 |
| 7,707,396 | B2* | 4/2010 | Bradford et al. | 712/238 |
| 8,131,982 | B2* | 3/2012 | Emma et al. | 712/225 |
| 8,719,837 | B2* | 5/2014 | Hakewill et al. | 718/108 |

(Continued)

OTHER PUBLICATIONS

Ayoub et al., "Filtering global history: Power and Performance Efficient Branch Predictor", 2009 20th IEEE Internatinal Conference on Application-specific Systems, Architectures and Processors, 2009 IEEE, pp. 203-206.

(Continued)

*Primary Examiner* — Corey S Faherty
(74) *Attorney, Agent, or Firm* — Cantor Colburn LLP; Margaret McNamara

(57) ABSTRACT

Embodiments of the disclosure include mitigating instruction prediction latency with independently filtered instruction prediction presence predictors coupled to the processor pipeline. The prediction presence predictor includes a plurality of presence predictors configured to each receive an instruction address in parallel and to generate an unfiltered indication of an associated instruction prediction. The prediction presence predictor includes a plurality of dynamic filters that are each coupled to one of the plurality of presence predictors. Each dynamic filter is configured to block the unfiltered indications based on a performance of the presence predictor it is coupled to. The prediction presence predictor further including stall determination logic coupled to the plurality of dynamic filters. The stall determination logic is configured to generate a combined indication that will stall instruction delivery, allowing potentially latent instruction predictions to be accounted for, based upon one or more non-blocked indications received from the plurality of dynamic filters.

13 Claims, 7 Drawing Sheets

(56) References Cited

U.S. PATENT DOCUMENTS

| | | | |
|---|---|---|---|
| 9,003,422 B2* | 4/2015 | Hakewill et al. | 718/108 |
| 2004/0015683 A1 | 1/2004 | Emma et al. | |
| 2005/0216713 A1 | 9/2005 | Prasky et al. | |
| 2005/0278513 A1* | 12/2005 | Aristodemou et al. | 712/240 |
| 2006/0149933 A1 | 7/2006 | Eickemeyer et al. | |
| 2008/0120496 A1* | 5/2008 | Bradford et al. | 712/239 |
| 2009/0204797 A1* | 8/2009 | Bonanno et al. | 712/239 |
| 2009/0204798 A1* | 8/2009 | Alexander et al. | 712/240 |

OTHER PUBLICATIONS

Disclosed Anonymously, Method for adding a confidence mechanism to a branch prediction corrector; IP.com No. IPCOM000137911D; IP.com Electronic Publication: Jun. 29, 2006, ip.com; www.ip.com; 5 pages.

IBM, "Method to Exclude Bad Patterns From a Pattern History Table Branch Predictor", Ip.com No. IPCOM000191968D; Original Publication Date: Jan. 19, 2010, ip.com; www.ip.com; 5 pages.

Webb, C.F., "S/390 microprocessor design", IBM J. Res. Develop. vol. 44, No. 6, Nov. 2000, pp. 899-907.

* cited by examiner

MITIGATING INSTRUCTION PREDICTION LATENCY WITH INDEPENDENTLY FILTERED PRESENCE PREDICTORS

CROSS-REFERENCE TO RELATED APPLICATION

This application is a continuation application of the legally related U.S. Ser. No. 13/523,784; filed Jun. 14, 2012, the contents of which are incorporated by reference herein in their entirety.

BACKGROUND

This invention relates to processor pipelines, and more particularly to mitigating instruction prediction latency with independently filtered presence prediction at the time of instruction fetching.

Instruction prediction, such as branch prediction, is a performance-critical component of a pipelined high frequency microprocessor and is used to predict the direction (taken vs. not taken) and the target address of branch instructions. Branch prediction is beneficial because it allows processing to continue along a branch's predicted path rather than having to wait for the outcome of the branch to be determined. An additional penalty is incurred only if a branch is mis-predicted.

A branch target buffer (BTB) is a structure that stores branch and target information. Other structures such as a branch history table (BHT) and pattern history table (PHT) can be included to store information used for branch direction prediction.

The BTB can be searched independently from instruction fetching to find upcoming branches, in which case it is called lookahead, or asynchronous, branch prediction. Lookahead branch prediction can be implemented in such a way that branch prediction is usually ahead of instruction fetching and decode. In such a configuration, branch predictions steer instruction fetching. This is an effective instruction pre-fetch mechanism particularly if the BTB instruction footprint is bigger than that of the first level instruction cache. There are times however when the BTB search falls behind, which most frequently happens after restart conditions when there is a race between the BTB trying to predict the first upcoming branch instruction and the instruction fetch logic trying to fetch and deliver the new instruction stream. It is also possible for the BTB to fall behind if its throughput cannot keep up with the number of branches in the instruction stream. In such cases when the BTB falls behind and is not able to provide branch prediction information for branch instructions, such branches are predicted using a less accurate predictor. If such branches are guessed as taken, instruction fetching is restarted once the target address of the branch is computed.

One current solution to reduce or mitigate branch prediction delay is the use of hierarchical predictors. Hierarchical approaches include multi-level caching, overriding, and cascading predictors. All of these approaches involve combining small-and-fast predictors with large-and-slow predictors. In a lookahead predictor as described above, two level caching can help reduce prediction latency, but typically does not eliminate cases where the BTB falls behind. An overriding predictor combines a small and fast first level predictor that can be overridden by a larger and slower predictor. Typically, an overriding predictor can add complexity and may not eliminate latency problems in a lookahead design. An overriding predictor could reduce latency problems if the first level BTB predictor were smaller than it otherwise would be, but doing so would also decrease the pre-fetching benefit and prediction accuracy provided from the first level BTB. Cascading accesses different latency predictors in parallel and uses the most accurate predictor available in time for the branch. As with the previous two approaches, this approach may not solve the latency problem in a lookahead predictor. Implementing a cascading structure in a lookahead predictor is not straightforward because the prediction needs to be used immediately to redirect the BTB search and deciding whether to redirect the prediction search with the quickest prediction or to wait for the slowest prediction is difficult.

SUMMARY

Embodiments include a method, system, and computer program product for mitigating instruction prediction latency, the method includes receiving an instruction address in an instruction cache for fetching instructions in a processor pipeline. The method also includes receiving the instruction address in a prediction presence predictor coupled to the processor pipeline. The prediction presence predictor includes a single or plurality of presence predictors, each coupled with a dynamic filter, configured to each receive the instruction address in parallel and to generate an unfiltered indication of an associated BTB prediction. Each dynamic filter is configured to block the unfiltered indications based on the performance of the presence predictor it is coupled to. The prediction presence predictor further includes a stall determination logic coupled to the plurality of dynamic filters. The stall determination logic is configured to generate a combined indication of the associated prediction based upon one or more filtered indications received from the plurality of dynamic filters. Based on receipt of the combined indication from the prediction presence predictor, the method includes holding instructions extracted from the instructions being fetched when they are determined to be BTB predictable by opcode, but such a prediction is not yet available. Based on either the receipt of a branch prediction from a branch target buffer or reaching a pre determined programmable timeout period, the method includes releasing said held instructions to the pipeline for execution. Instructions may also be released, or prevented from being stalled in the first place, when it is determined that the branch prediction search results are beyond the point of the instruction(s) being examined, which effectively means a prediction for the instruction will never be, or already is, available.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

An exemplary embodiment includes a system and method implementing lookahead branch prediction using a branch target buffer (BTB), in which branch presence prediction can be done at the time instructions are fetched. In an exemplary embodiment, the same address sent to the instruction cache for fetching instructions is also sent to the prediction presence predictor (PPP). The PPP predicts whether any of the fetched instructions are thought to have an associated branch prediction in the BTB. When instructions are being extracted from the data returned from the instruction cache, instructions thought to have associated BTB predictions by the PPP, and validated as BTB predictable instructions by opcode, are stalled until either a branch prediction from the BTB is available, or a timeout has occurred. The PPP allows the BTB to catch up to fetching and instruction delivery. The accurate prediction from the BTB can be used instead of having to rely on a less accurate prediction or guess. In an exemplary embodiment, there is no additional need to re-steer the instruction fetching and branch prediction logic. Furthermore, branches that have latency problems can be identified and therefore installed into any special mechanisms that may exist to prevent the latency problem on future occurrences of the branch.

Figure 1:
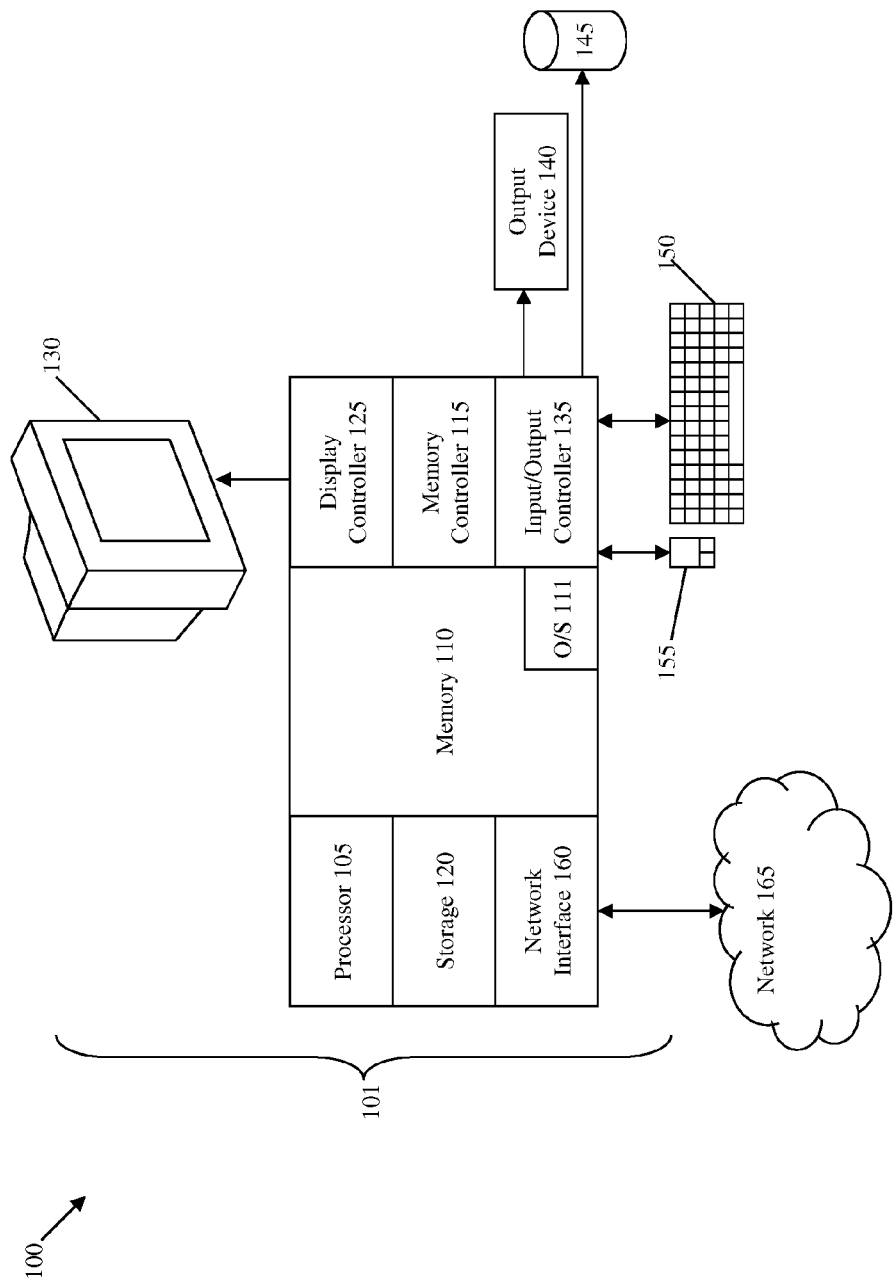
FIG. 1 illustrates a block diagram of a system in accordance with an exemplary embodiment.

FIG. 1 illustrates a block diagram of a system 100 for mitigating lookahead branch prediction latency with branch presence prediction at the time of instruction fetching. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that are stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 includes a suitable operating system (OS) 111. The operating system 111 essentially controls the execution of other computer programs and provides scheduling, input-output control, file and data management, memory management, and communication control and related services.

The branch prediction latency mitigation methods described herein are part of a microprocessor.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. The computer 101 can include any suitable computer readable medium 120 for use by or in connection with any computer related system or method.

In an exemplary embodiment, where the branch prediction latency mitigation methods are implemented in hardware, the branch prediction latency mitigation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
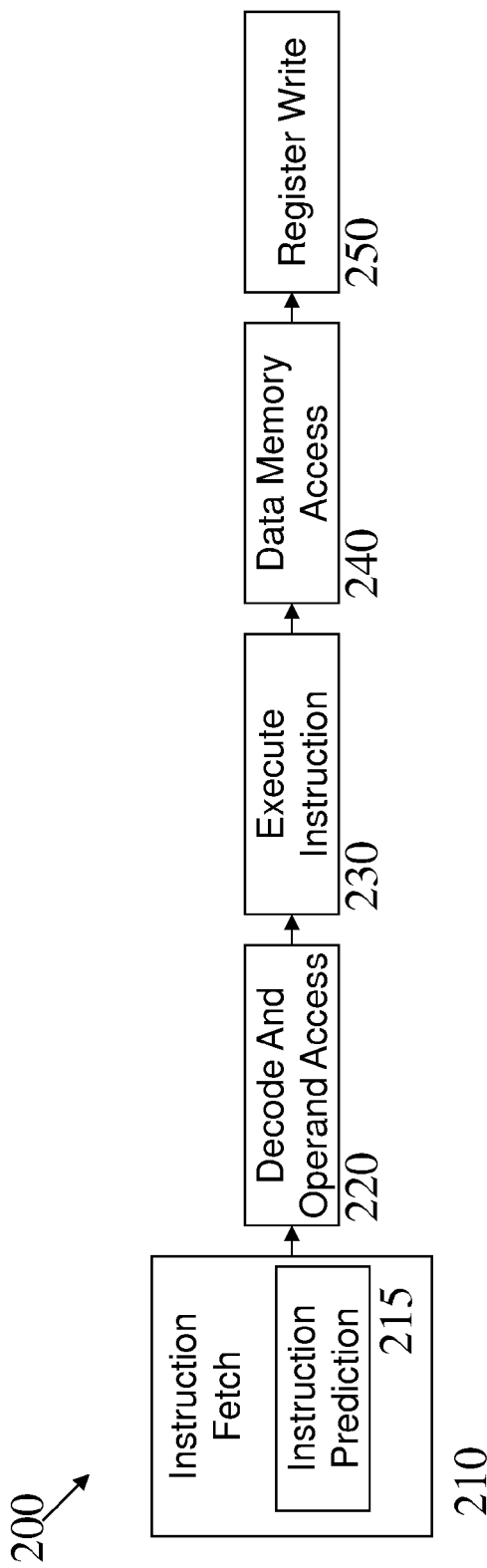
FIG. 2 illustrates a block diagram of a processor instruction pipeline system in which the exemplary prediction latency mitigation methods can be implemented in accordance with an exemplary embodiment.

FIG. 2 illustrates a block diagram of a processor instruction pipeline system 200 in which the exemplary branch prediction latency mitigation methods can be implemented in accordance with an exemplary embodiment. As described above, the simplest way to speed up the processor 105 operation is to pipeline it. Pipelining is one specific form of parallelism, where the execution of several instructions can be interleaved on the same hardware. In an exemplary embodiment, the pipeline system includes five stages: (1) instruction fetch 210; (2) decode and operand access 220; (3) execute instruction 230; (4) data memory access 240; and (5) register write 250. In an exemplary embodiment, the instruction fetch 210 stage fetches instructions to be processed. The decode and operand access 220 stage decodes the instruction and gathers the source operands needed by the instruction being processed. The execute instruction 230 stage performs the function of the instructions that can include arithmetic logic unit (ALU) operations. The data memory access 240 stage performs any data memory access functions associated with the instruction. The write register write 250 stage writes the appropriate result value into the register file. As described above, the pipeline system 200 can be enhanced by including an instruction prediction phase 215 to the instruction fetch 210 stage. The instruction prediction phase may include the PPP allowing the BTB to catch up to fetching and instruction delivery. The accurate prediction from the BTB can be used instead of having to rely on a less accurate prediction. As such, there is no additional need to re-steer the instruction fetching and branch prediction logic. Furthermore, branches that have latency problems can be identified and therefore installed into any special mechanisms that may exist to prevent the latency problem on future occurrences of the branch.

Figure 3:
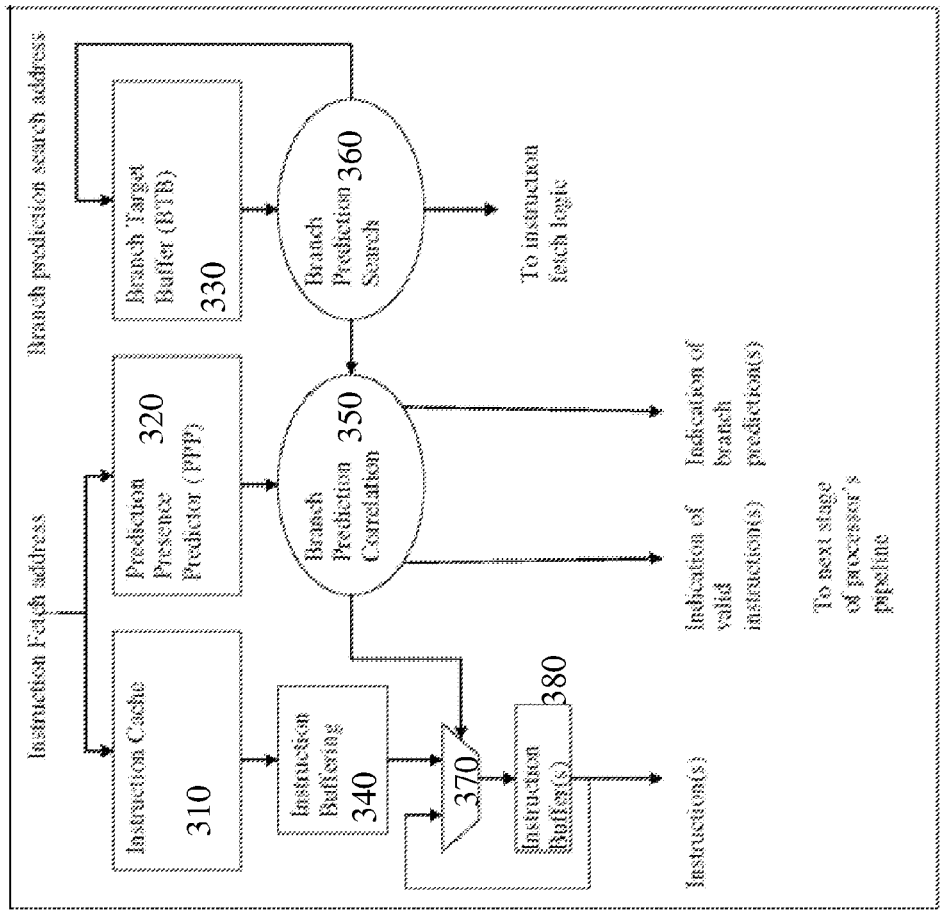
FIG. 3 illustrates instruction fetch stages of the pipeline of FIG. 2 and shows the presence predictor and asynchronous lookahead branch predictor in accordance with an exemplary embodiment.
Figure 4:
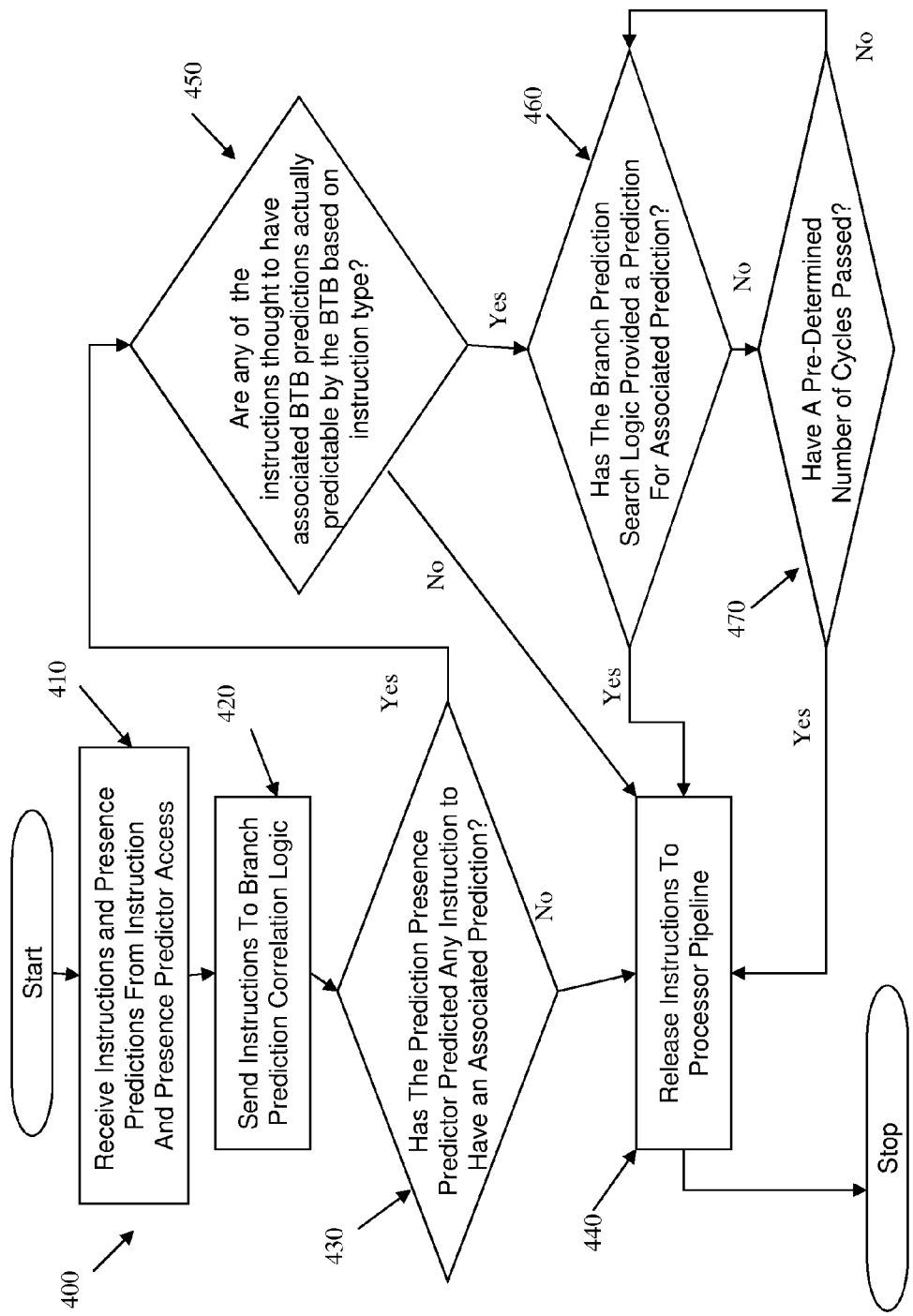
FIG. 4 illustrates a flow chart of a method for mitigating lookahead branch prediction latency with presence prediction at the time of instruction fetching in accordance with an exemplary embodiment.

Turning now to FIGS. 3 and 4, exemplary embodiments of instruction fetch stages of the pipeline of FIG. 2 are illustrated. It will be understood by those of ordinary skill in the art that although branch instructions are shown and described, the techniques disclosed may be used with any predictable instructions, which include, but are not limited to, branch instructions.

FIG. 3 illustrates an instruction prediction stage 300 of the pipeline 200 of FIG. 2 in which the branch prediction latency mitigation methods may be implemented in accordance with an exemplary embodiment. In an exemplary embodiment, the stage 300 includes an instruction cache 310 coupled to an instruction buffer 340. The instruction buffer 340 can also be coupled to a multiplexer 370, which can further be coupled to additional instruction buffers 380. In an exemplary embodiment, the stage can further include a prediction presence predictor (PPP) 320, which can be coupled to branch prediction correlation logic 350. In an exemplary embodiment, the branch prediction correlation logic 350 can be coupled to the multiplexer 370. The stage 300 can further include a branch target buffer (BTB) 330, which can be coupled to branch prediction search logic 360. The branch prediction search logic 360 can further be coupled to the branch prediction correlation logic 350. As further described herein, the branch prediction correlation logic 350 can pass both an indication of valid instructions and an indication of branch predictions into the pipeline 200. In addition, the branch prediction search logic 360 can pass results to instruction fetch logic in the pipeline 200.

FIG. 4 illustrates a flow chart of a method 400 for mitigating lookahead branch prediction latency with branch presence prediction at the time of instruction fetching in accordance with an exemplary embodiment. At block 410, instructions in the pipeline 200 are received from the instruction cache 310 and the PPP 320 are accessed. As such, encountered branch instructions that have predictions written into the BTB 330 are also written into the PPP 320. In an exemplary embodiment, branches that are not written into the BTB 330—such as those that have never been taken in the past and are not likely to be taken—are never written into the PPP 320. In an exemplary embodiment, the writes into the PPP 320 can occur upon completing branch instructions. They can alternatively occur any time a branch instruction that would benefit from the BTB 330 is recognized. Recognition could occur due to finding such a branch anywhere in the pipeline 200—including at the instruction prediction stage 215. Ideally a branch should also be guaranteed to already exist in the BTB 330 or be added to the BTB 330 co-currently with the write into the PPP 320 in order for it to be useful in the PPP 320. In an exemplary embodiment implementing one or more set associative presence predictors, it is desirable to avoid duplicate entries in the PPP 320. The PPP 320 is read in parallel with the instruction cache 310. As a function of the fetch address, it returns whether any of the instructions being fetched are in the PPP 320. At block 420, this information and accompanying instruction are sent to the branch prediction correlation logic 350.

In an exemplary embodiment, the branch prediction correlation logic 350 determines when an instruction may be sent into the processor's pipeline 200. At block 430, the PPP 320 determines whether each of the instructions has been PPP predicted to have an associated BTB prediction. If an instruction has not been predicted to have an associated BTB prediction by the PPP 320 at block 430, then at block 440, the instruction can be released. If the instruction has been predicted to have an associated BTB prediction by the PPP 320 at block 430, then the method proceeds to block 450. Since at block 450, the instruction is predicted by the PPP 320 to have an associated BTB prediction, the branch prediction correlation logic 350 does not immediately release this instruction into the pipeline 200 unless the instruction is either not of a predictable type or already has a BTB prediction tagged to it. The correlation logic 350 then waits until either the branch prediction search logic 360 provides a prediction for the associated prediction at block 460, or until a predetermined number of cycles pass at block 470 before releasing the instruction, beyond the buffer 380, at block 440.

Figure 5:
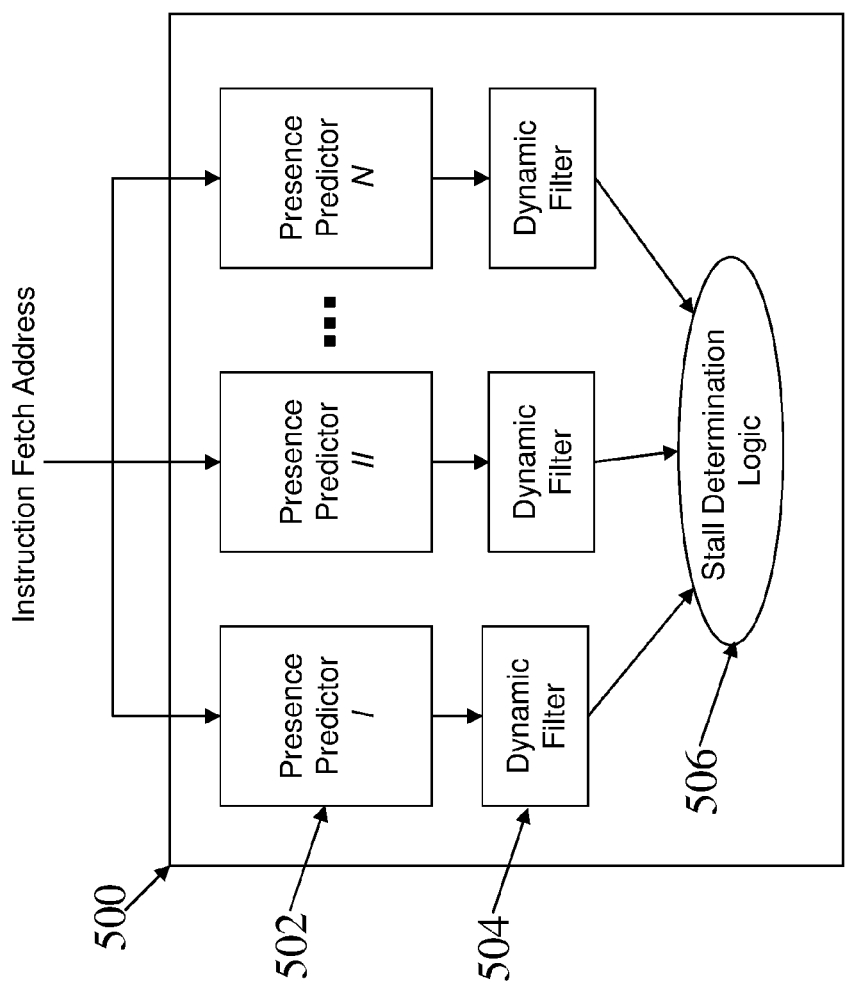
FIG. 5 illustrates a block diagram of a presence predictor in accordance with an exemplary embodiment.

Referring now to FIG. 5, a block diagram of a branch presence predictor 500 in accordance with an exemplary embodiment is shown. As illustrated, the branch presence predictor 500 includes a plurality of presence predictors 502 which each receive an instruction fetch address in parallel.

Each of the plurality of presence predictors 502 is coupled to one of a plurality of dynamic filters 504 and all of the dynamic filters 504 are coupled to stall determination logic 506. In exemplary embodiments, each of the presence predictors 502 includes an algorithm and/or hierarchical structure that are configured to determine if the instruction has an associated BTB prediction based on the instruction fetch address. In exemplary embodiments, each of the presence predictors 502 can be configured to use different methods to predict if the instruction has an associated BTB prediction. For example, one presence predictor may be a queue of the last n partial instruction addresses predicted by the BTB. Another presence predictor can be a single bit per entry structure set as predictions are installed into the BTB, and cleared upon BTB invalidation or failed stall events. Such structures may be very quick to access at instruction fetch time, but may suffer from greater aliasing rates compared to a well tagged BTB. Note that the dynamic filter and opcode qualifications would directly reduce the negative effects of the aforementioned aliasing In exemplary embodiments, each of the presence predictors 502 are configured to provide one of the dynamic filters 504 an indication of whether the presence predictor 502 predicts that the instruction has an associated BTB prediction, also referred to as an unfiltered indication. The dynamic filters 504 are configured to track the performance of the corresponding presence predictors 502 by tracking if the instructions hinted at end up actually predicted by the BTB. Based on the past performance of the presence predictor 502, the dynamic filter 504 provides a filtered indication if the instruction has an associated PPP prediction to the stall determination logic 506. In exemplary embodiments, each dynamic filter 504 may include a counter which is incremented when an associated presence predictor 502 incorrectly predicts that the instruction has an associated BTB prediction resulting in a failed stall. As used herein, a successful stall refers to a stall that results in a dynamic BTB prediction being applied to a stalled instruction and a failed stall is a stall that times out and releases its instructions without having applied a dynamic BTB prediction. In exemplary embodiments, instruction stalling occurs on dynamically predictable instructions that have a synchronous presence prediction, and no actual asynchronous dynamic branch prediction available for tagging to the instruction.

In exemplary embodiments, each dynamic filter 504, which is associated with one presence predictor 502, includes a counter which increases upon the occurrence of a failed stall that was influenced by its associated presence predictor 502. When the counter of a dynamic filter 504 reaches a failure threshold count, the dynamic filter 504 is configured to prevent its associated presence predictor 502 from influencing stalls for a period. For example, the dynamic filter 504 may prevent the indication generated by the presence predictor 502 from being transmitted to the stall determination logic 506. In exemplary embodiments, the period may be an adjustable amount of time and/or number of stall events. After the period is complete the counter of the dynamic filter 504 may be reset to zero or any other predetermined value. In exemplary embodiments, the failure threshold count of the dynamic filter 504 can be configured based on the algorithm and/or hierarchical structure of its associated presence predictor 502. In exemplary embodiments, the prediction presence predictor 500 may include an option or command that is configured to reset the values of the counter of each of the dynamic filters 504 at the same time. For example, if a task swap or a virtual machine swap occurs the prediction presence predictor 500 may reset all counters to zero or any other predetermined value.

In exemplary embodiments, the counter may be configured to decrement on a successful stall, which essentially gives credit for success over time in the presence of periodic failed stalls. By both increasing the counter on failed stalls and decreasing the counter on successful stalls, the build up of the counter over time from periodically failed stalls can be avoided, which reduces the chances of putting a well working presence predictor 502 into blocked mode. In exemplary embodiments, the counter is configured to only decrement to a minimum value of zero and to have a maximum value which the counter is configured to not exceed.

While the presence predictor 502 is not influencing stalling the presence predictor 502 continues to operate in a blocked mode. In exemplary embodiments, while a presence predictor 502 is being operated in blocked mode, meaning it is currently prevented from influencing stalls, its output can be monitored for corrective feedback. For example, the accuracy of the output can be used to extend or shorten the period that the presence predictor 502 remains in the blocked mode. If the presence predictor 502 continues to be incorrect while in blocked mode, the period can be extended. Likewise, if a presence predictor 502 is highly accurate while in blocked mode, the period can be decreased.

In exemplary embodiments, the stall determination logic 506 receives filtered indications that an instruction is thought to have an associated BTB prediction from the dynamic filters 504 and responsively transmits a signal indicative of whether the instruction is thought to have an associated prediction to the branch prediction correlation logic 350, as shown in FIG. 3. By using a plurality of presence predictors 502 with dynamic filters 504, asynchronous prediction latency can be reduced and the performance of the prediction presence predictor 500 can be improved.

Figure 6:
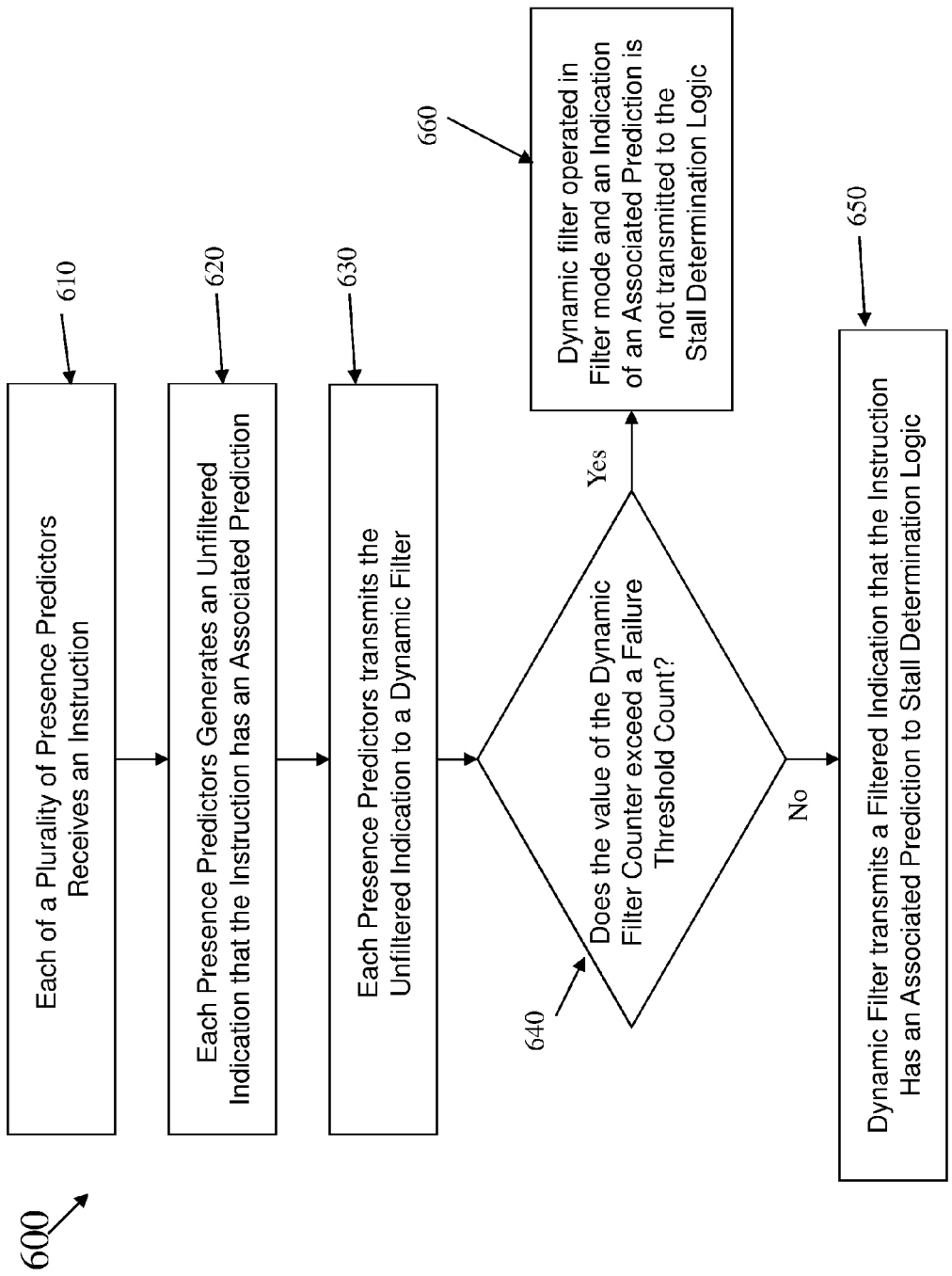
FIG. 6 illustrates a flow chart of a method for generating an indication that a branch instruction is present in accordance with an exemplary embodiment.

Referring now to FIG. 6, a flow chart of a method for generating an indication that an instruction with an associated BTB prediction is present in accordance with an exemplary embodiment is shown. As shown at block 610, each of a plurality of presence predictors receives an instruction address. Next, as shown at block 620, each presence predictor generates an unfiltered indication that a corresponding BTB prediction exists for the instruction address. Then, each presence predictor transmits the unfiltered indication that a BTB prediction is present to a dynamic filter, as shown at block 630. As shown at decision block 640, the dynamic filter determines if the value of its counter exceeds a failure threshold count. If the value of the counter of the dynamic filter does not exceed the failure threshold count, the dynamic filter transmits the indication that a BTB prediction exists to stall determination logic, as shown at block 650. Otherwise, as shown at block 660, the dynamic filter is operated in a blocked mode and an indication that a BTB prediction is present is not transmitted to the stall determination logic. In exemplary embodiments, the counter of each dynamic filter is incremented upon the detection of a failed stall and decremented upon the detection of a successful stall.

As a result of the summarized disclosure, the systems and methods described herein provide a PPP that allows the BTB to catch up to fetching and instruction delivery. The accurate prediction from the BTB can be used instead of having to rely on a less accurate prediction. There is no additional need to re-steer the instruction fetching and branch prediction logic. Furthermore branches that have latency problems can be identified and therefore installed into any special mechanisms that may exist to prevent the latency problem on future occurrences of the branch.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
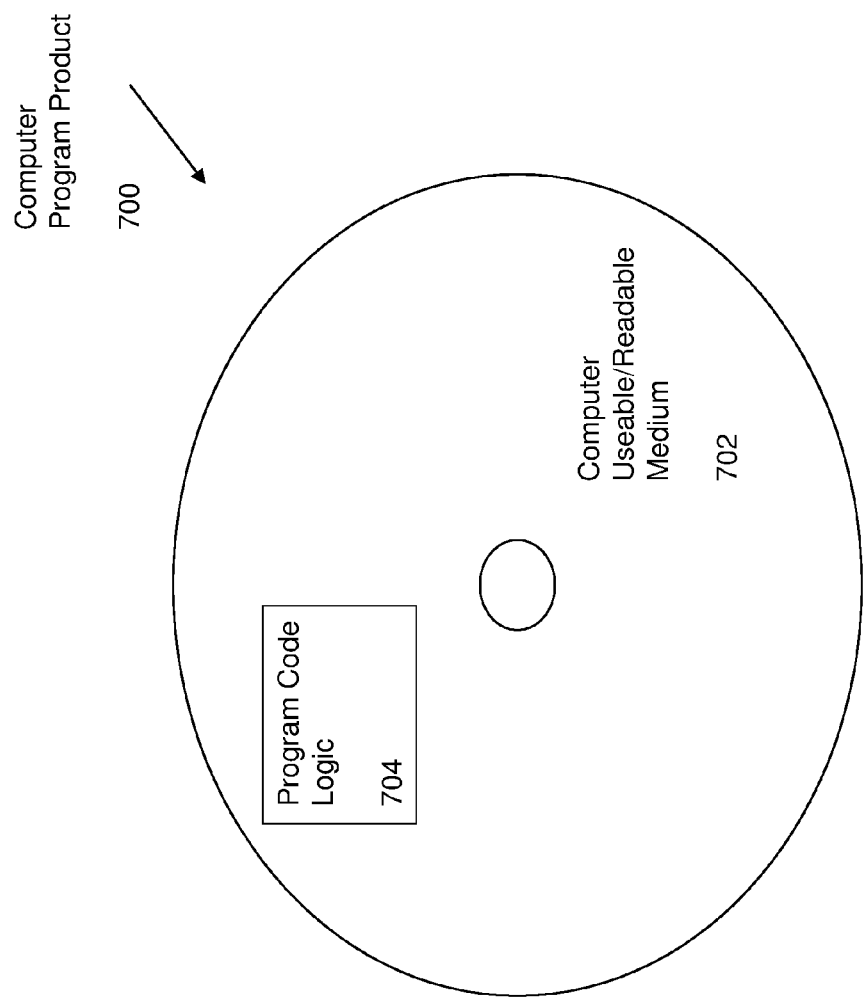
FIG. 7 illustrates a computer program product in accordance with an embodiment.

Referring now to FIG. 7, in one example, a computer program product 700 includes, for instance, one or more storage media 702, wherein the media may be tangible and/or non-transitory, to store computer readable program code means or logic 704 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a method, system, and computer program product for mitigating instruction prediction latency, the method includes receiving an instruction address in an instruction cache for fetching instructions in a processor pipeline. The method also includes receiving the instruction address in a prediction presence predictor coupled to the processor pipeline. The prediction presence predictor includes a single or plurality of presence predictors, each coupled with a dynamic filter, configured to each receive the instruction address in parallel and to generate an unfiltered indication of an associated BTB prediction. Each dynamic filter is configured to block the unfiltered indications based on the performance of the presence predictor it is coupled to. The prediction presence predictor further includes a stall determination logic coupled to the plurality of dynamic filters. The stall determination logic is configured to generate a combined indication of the associated prediction based upon one or more filtered indications received from the plurality of dynamic filters. Based on receipt of the combined indication from the prediction presence predictor, the method includes holding instructions extracted from the instructions being fetched when they are determined to be BTB predictable by opcode, but such a prediction is not yet available. Based on either the receipt of a branch prediction from a branch target buffer or reaching a pre determined programmable timeout period, the method includes releasing said held instructions to the pipeline for execution. Instructions may also be released, or prevented from being stalled in the first place, when it is determined that the branch prediction search results are beyond the point of the instruction(s) being examined, which effectively means a prediction for the instruction will never be, or already is, available.

In an embodiment, the each dynamic filter includes a counter that is configured to track the performance of the presence predictor it is coupled to.

In an embodiment, filtering the unfiltered indication based on a performance of the presence predictor it is coupled to comprises determining if a value of the counter exceeds a failure threshold count.

In an embodiment, based on a determination that the value of the counter does not exceed the failure threshold count, the dynamic filter is configured to transmit the filtered indication to the stall determination logic.

In an embodiment, the counter of a dynamic filter is incremented, up to an incrementing saturation point, based on the presence predictor it is coupled to incorrectly predicting the associated prediction resulting in a failed stall.

In an embodiment, the counter of a dynamic filter is decremented, down to a decrementing saturation point, based on the presence predictor it is coupled to correctly predicting the associated prediction resulting in a successful stall.

In an embodiment, based on a determination that the value of the counter exceeds the failure threshold count, the dynamic filter is configured to operate in a blocked mode during which the dynamic filter prevents the presence predictor it is coupled to from influencing stalls for a period.

Technical effects and benefits include mitigating instruction prediction latency with independently filtered instruction prediction presence predictors coupled to the processor pipeline. The prediction presence predictor includes a plurality of dynamic filters that are each configured to block the unfiltered indications based on a performance of the presence predictor it is coupled to.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for mitigating instruction prediction latency, the method comprising:
    receiving an instruction address in an instruction cache for fetching instructions in a processor pipeline;
    receiving the instruction address in a prediction presence predictor coupled to the processor pipeline, the prediction presence predictor comprising:
        a plurality of presence predictors configured to each receive the instruction address in parallel and to each generate an unfiltered indication of an associated prediction; and
        a plurality of dynamic filters that are each coupled to one of the plurality of presence predictors, wherein each dynamic filter is configured to block the unfiltered indications based on a performance of the presence predictor it is coupled to; and
        a stall determination logic coupled to the plurality of dynamic filters, wherein the stall determination logic is configured to generate a combined indication of the associated prediction based upon one or more filtered indications received from the plurality of dynamic filters;
    based on receipt of the combined indication from the prediction presence predictor, holding instructions extracted from the instructions being fetched when they are determined to be predictable by opcode, but such a prediction is not yet available; and
    based on the receipt of a branch prediction from a branch target buffer, releasing said held instructions to the pipeline for execution.

2. The method of claim 1, wherein each dynamic filter includes a counter that is configured to track the performance of the presence predictor it is coupled to.

3. The method of claim 2, wherein filtering the unfiltered indication based on a performance of the presence predictor it is coupled to comprises determining if a value of the counter exceeds a failure threshold count.

4. The method of claim 3, wherein based on a determination that the value of the counter does not exceed the failure threshold count, the dynamic filter is configured to transmit the filtered indication to the stall determination logic.

5. The method of claim 2, wherein the counter of a dynamic filter is incremented, up to an incrementing saturation point, based on the presence predictor it is coupled to incorrectly predicting the associated prediction resulting in a failed stall.

6. The method of claim 5, wherein the counter of a dynamic filter is decremented, down to a decrementing saturation point, based on the presence predictor it is coupled to correctly predicting the associated prediction resulting in a successful stall.

7. The method of claim 3, wherein based on a determination that the value of the counter exceeds the failure threshold count, the dynamic filter is configured to operate in a blocked mode during which the dynamic filter prevents the presence predictor it is coupled to from influencing stalls for a period.

8. A computer program product for implementing a method for mitigating instruction prediction latency, the computer program product comprising:
a non-transitory storage medium readable by a processing circuit and storing instructions for execution by the processing circuit for performing a method comprising:
receiving an instruction address in an instruction cache for fetching instructions in a processor pipeline;
receiving the instruction address in a prediction presence predictor coupled to the processor pipeline, the prediction presence predictor comprising:
a plurality of presence predictors configured to each receive the instruction address in parallel and to each generate an unfiltered indication of an associated prediction; and
a plurality of dynamic filters that are each coupled to one of the plurality of presence predictors, wherein each dynamic filter is configured to block the unfiltered indications based on a performance of the presence predictor it is coupled to; and
a stall determination logic coupled to the plurality of dynamic filters, wherein the stall determination logic is configured to generate a combined indication of the associated prediction based upon one or more filtered indications received from the plurality of dynamic filters;
based on receipt of the combined indication from the prediction presence predictor, holding instructions extracted from the instructions being fetched when they are determined to be predictable by opcode, but such a prediction is not yet available; and
based on receipt of a branch prediction from a branch target buffer, releasing said held instructions to the pipeline for execution.

9. The computer program product of claim 8, wherein each dynamic filter includes a counter that is configured to track the performance of the presence predictor it is coupled to.

10. The computer program product of claim 9, wherein filtering the unfiltered indication based on a performance of the presence predictor it is coupled to comprises determining if a value of the counter exceeds a failure threshold count.

11. The computer program product of claim 10, wherein based on a determination that the value of the counter does not exceed the failure threshold count, the dynamic filter is configured to transmit the filtered indication to the stall determination logic.

12. The computer program product of claim 9, wherein the counter of a dynamic filter is incremented, up to an incrementing saturation point, based on the presence predictor it is coupled to incorrectly predicting the associated prediction resulting in a failed stall.

13. The computer program product of claim 10, wherein based on a determination that the value of the counter exceeds the failure threshold count, the dynamic filter is configured to operate in a blocked mode during which the dynamic filter prevents the presence predictor it is coupled to from influencing stalls for a period.

* * * * *